May 8, 1928.
S. SAVAGE
TOY PEDAL CAR
Filed April 21, 1927
1,668,784
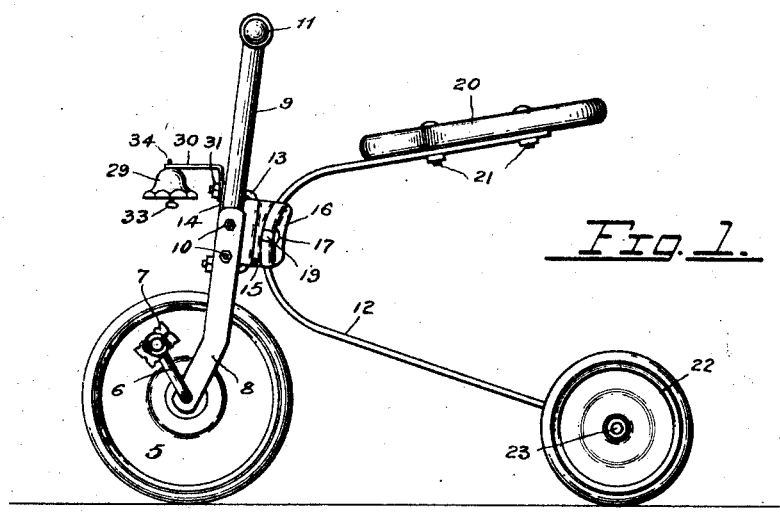
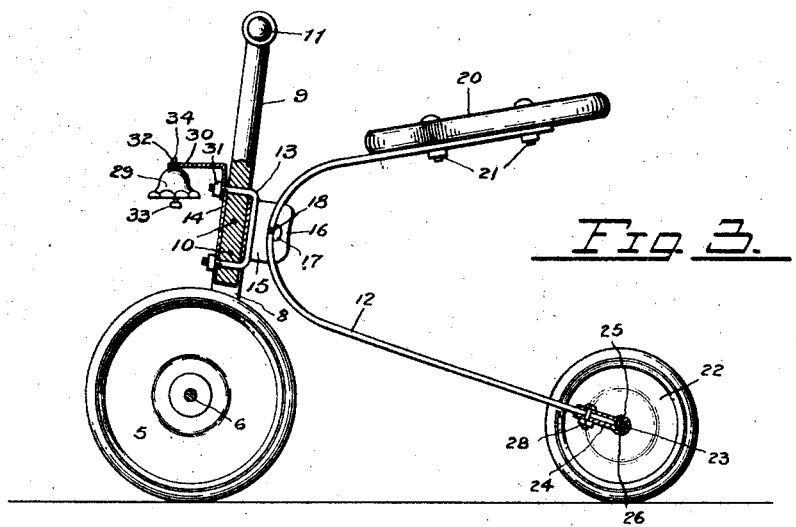
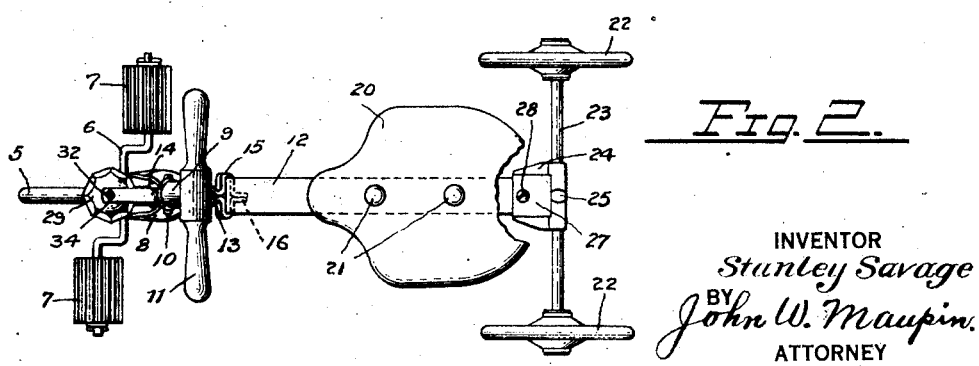
INVENTOR
Stanley Savage
BY
John W. Maupin
ATTORNEY Patented May 8, 1928.

1,668,784

UNITED STATES PATENT OFFICE.

STANLEY SAVAGE, OF SEATTLE, WASHINGTON.

TOY PEDAL CAR.

Application filed April 21, 1927. Serial No. 185,643.

This invention relates to toy pedal cars and is an improvement over my co-pending application for spring coaster bicycles, Serial Number 117,396, filed June 21, 1926. Certain objects of this invention are to provide a pedal car in the form of a tricycle having a fork for the front wheel pivotally connected with a relatively wide U-shaped flat spring, the upper end of which serves as a support for a seat, and the lower end is rigidly secured to the rear axle, whereby a simple easy riding car is provided that will pass over obstructions without appreciable shock to the rider. Another object is to provide novel means for pivotally connecting the front fork and bend of the wide U-shaped spring. A further object is to provide novel means for rigidly securing the lower end of the wide spring to the rear axle. Still further objects are to provide a bell and means for ringing same in combination with this particular form of toy.

With the above and other objects in view which will appear as the description proceeds, the invention consists of the novel construction, arrangement and combination of parts hereinafter described and claimed. These objects are accomplished by devices illustrated in the accompanying drawings; wherein:—

Figure 1 is a view in side elevation of a toy pedal car embodying certain features of the invention;

Fig. 2 is a top plan view of the same; and

Fig. 3 is a view in central vertical section with certain parts shown in elevation.

Referring to the drawings throughout which like reference numerals designate like parts, the numeral 5 indicates the front wheel that is fixedly secured to a pedal crank axle 6 provided with pedals 7 and revolubly mounted on the lower arms 8 of the front fork. Said arms are rigidly secured to the steering post 9 by bolts 10 and a handle bar 11 is fastened to the upper end of said post in any desired and suitable manner. The lower arms are preferably made of metal while the post and handle bar are made of wood.

The numeral 12 designates the wide flat U-shaped spring and the means for connecting said spring with the fork comprises a stirrup bolt 13 whose ends are passed through the post 9 and secured by nuts with a plate 14 interposed to prevent chafing of the post. A wing plate 15 is pivotally looped around said stirrup bolt and bent around the curved middle portion of said flat U-shaped spring with its inner ends brought together at 16. Holes 17 may be provided through said inner ends to render the plate more resilient so that it will have a springy tendency to bend with the flat spring and thus obviate any stiffness that might cause the spring to become brittle or otherwise impaired. Said spring and plate are prevented from slipping out of place by means of a notch 18 cut in each side of the spring and dents 19 in the plate protruding into said notches as will be readily understood.

A relatively wide seat 20, preferably made of wood, is secured to the upper end portion of the U-shaped spring 12 by means of bolts 21. Rear wheels 22 are connected by an axle 23 that is centrally secured to the lower end of said U-shaped spring by means of a foldable plate 24. Said plate is bent securely around said axle and a dent 25 therein fits into a notch 26 in the axle to prevent same from slipping out of place. The side edges of said plate fit flush together and both its upper and lower middle portions are pressed outwardly to form a rectangular pocket 27. The lower end of the U-shaped spring fits snugly within said pocket in abutment with the rear axle and is held by a small bolt 28.

It will thus be seen that the U-shaped spring serves as a support for the seat and as a connecting means for the forward and rear wheels. The rider's weight will cause the seat 20 to spring up and down and this motion will cause the fork to pivotally move back and forth on the forward axle 6, and this particular motion is utilized in ringing a bell 29 mounted on said fork. Said bell is fixedly secured to the outer end of a bracket 30 whose inner end is bent downwardly and provided with a hole through which the upper end of the stirrup bolt 13 is passed and held by the nut 31. A hole 32 passes centrally through the top of the bell and through the outer end of said bracket and a clapper 33 is suspended from a winged head 34 that is pivotally supported by said hole. Thus the motion of the vehicle will cause a continual jingling of the bell that will serve to amuse the child rider besides serving as a signal to pedestrians and as a means for locating the rider.

Having thus described my invention, it being understood that minor changes may be resorted to without departing from its scope and spirit, what I claim and desire to secure by Letters Patent is:—

1. A pedal car comprising a forward wheel having a pedal axle, a fork revolubly supported by said axle, a relatively wide U-shaped flat spring, a stirrup bolt secured through the post of the fork, a resilient wing plate pivotally looped around the stirrup bolt with its outer portion bent fixedly around the curved portion of the U-spring, a seat secured to the upper end of the spring, and two rear wheels having an axle fixedly secured to the lower end of said spring.

2. A pedal car comprising a forward wheel having a pedal axle fixed thereto, a fork comprising two arms revolubly supported by said axle, a steering post secured between said arms, a relatively wide U-shaped flat spring, a stirrup bolt secured through the steering post, a resilient wing plate pivotally looped around the stirrup bolt, said plate bent together around the curved portion of the U-spring, means for retaining said plate and spring in fixed relation, a seat secured to the upper end of the spring, and two rear wheels having an axle fixedly secured to the lower end of the spring.

3. A pedal car comprising a forward wheel having a pedal axle, a fork revolubly supported by said axle, a relatively wide U-shaped flat spring pivotally connected to said fork, a seat secured to the upper end portion of the spring, two rear wheels, an axle for said wheels in abutment with the lower end of said spring, a foldable plate around said axle overlapping the end of the spring, and securing means for said plate.

4. A pedal car comprising a forward wheel having a pedal axle, a relatively wide U-shaped flat spring, a stirrup bolt secured through the post of the fork, a resilient wing plate pivotally looped around said bolt, said plate bent together around the curved portion of the U-spring, means for retaining said plate and spring in fixed relation, a seat mounted on the upper end of the spring, two rear wheels, an axle for said wheels in abutment with the lower end of said spring, a foldable plate around the axle overlapping the lower end of the spring, and securing means for said plate.

5. A pedal car comprising a forward wheel having a pedal axle, a fork comprising two arms revolubly supported by said axle, a steering post secured between said arms, a stirrup bolt secured through said post, a bracket held by the upper end of the bolt, a bell fixed to said bracket, a clapper pivotally mounted in the bell, a U-shaped spring pivotally connected to the stirrup bolt, a seat mounted on the upper end of said spring, and two rear wheels having an axle fixedly secured to the lower end of the spring.

In witness whereof, I hereunto subscribe my name this 18th day of March, A. D. 1927.

STANLEY SAVAGE.